United States Patent [19]

Macedo et al.

[11] 4,362,659

[45] Dec. 7, 1982

[54] FIXATION OF RADIOACTIVE MATERIALS IN A GLASS MATRIX

[75] Inventors: Pedro B. Macedo, 6100 Highboro Dr., Bethesda, Md. 20034; Joseph H. Simmons, Potomac, Md.; Theodore A. Litovitz, 904 Devere Dr., Silver Spring, Md. 20903

[73] Assignees: Pedro B. Macedo, Bethesda; Theodore A. Litovitz, Silver Spring, both of Md.

[21] Appl. No.: 76,444

[22] Filed: Sep. 17, 1979

Related U.S. Application Data

[63] Continuation of Ser. No. 884,371, Mar. 9, 1978, Pat. No. 4,224,177, and a continuation-in-part of Ser. No. 836,778, Sep. 24, 1977, abandoned, which is a continuation-in-part of Ser. No. 784,437, Apr. 4, 1977, abandoned.

[51] Int. Cl.³ .............................................. G21F 9/02
[52] U.S. Cl. .................................. 252/629; 65/30.1; 250/493.1; 252/644
[58] Field of Search ............ 252/301.1 W, 644, 629; 106/52; 65/30.1, 30.11, 32; 250/493

[56] References Cited

U.S. PATENT DOCUMENTS

| | | | |
|---|---|---|---|
| 2,106,744 | 2/1938 | Hood et al. | 65/22 |
| 2,943,059 | 6/1960 | Beck et al. | 252/301.1 W |
| 3,114,716 | 12/1963 | Quinby | 252/301.1 R |
| 3,116,131 | 12/1963 | Beerman | 55/33 |
| 3,132,033 | 5/1964 | Tiede | 106/50 |
| 3,141,852 | 7/1964 | Dressler et al. | 252/301.1 R |
| 3,147,225 | 9/1964 | Ryan | 252/301.1 R |
| 3,167,504 | 1/1965 | Haden et al. | 210/24 |
| 3,364,148 | 1/1968 | Kivel | 252/301.1 R |
| 3,603,788 | 9/1971 | Miraldi | 252/301.1 W |
| 3,640,888 | 2/1972 | Baybarz et al. | 252/301.1 R |
| 3,868,170 | 2/1975 | De Luca | 65/30.1 |
| 3,971,717 | 7/1976 | Hild et al. | 252/301.1 W |
| 4,094,809 | 6/1978 | Ross | 252/301.1 W |
| 4,224,177 | 9/1980 | Macedo et al. | 252/301.1 W |
| 4,234,456 | 11/1980 | Kamiya et al. | 252/301.1 W |

FOREIGN PATENT DOCUMENTS

51-69799  6/1976  Japan ......................... 252/301.1 W

OTHER PUBLICATIONS

Sanyal, A. S. et al., "Fixation of High Level Atomic Waste in Glass for Ultimate Disposal", *J. Scient. Ind. Res.*, vol. 33, No. 9, pp. 436–460, Sep. 1974.

*Primary Examiner*—Deborah L. Kyle
*Attorney, Agent, or Firm*—Fisher, Christen & Sabol

[57] ABSTRACT

This invention relates to radioactive materials which are fixed, stored, entrapped, encapsulated, or otherwise rendered immobile in a glass matrix for extremely long periods of time. Radioactive material such as radioactive wastes are incorporated into a glass matrix by a process of "molecular stuffing" a porous glass either with a radioactive gas which is tapered in the porous glass by dissolution during sintering of the pores of the glass, or with a salt solution containing radioactive material such as $CsNO_3$, $Sr(NO_3)$, etc., or with a combination of both salt solution and radioactive gas, followed by drying and sintering of the pores of the glass whereby these radioactive materials upon chemical change to their oxides, excepting of course the noble gases which remain in molecular form, become a part of the integrated glass structure.

The resulting glass article may have the radioactive material dispersed essentially homogeneously throughout the glass article, or there may be a layer free of such radioactive waste material over the entire surface of the glass article. In either case such glass articles demonstrate an extremely slow diffusion of the encapsulated radioactive material to the surrounding area.

12 Claims, 1 Drawing Figure

(a) Sample from Example 2.
(b) Sample obtained from Battelle Northwest.

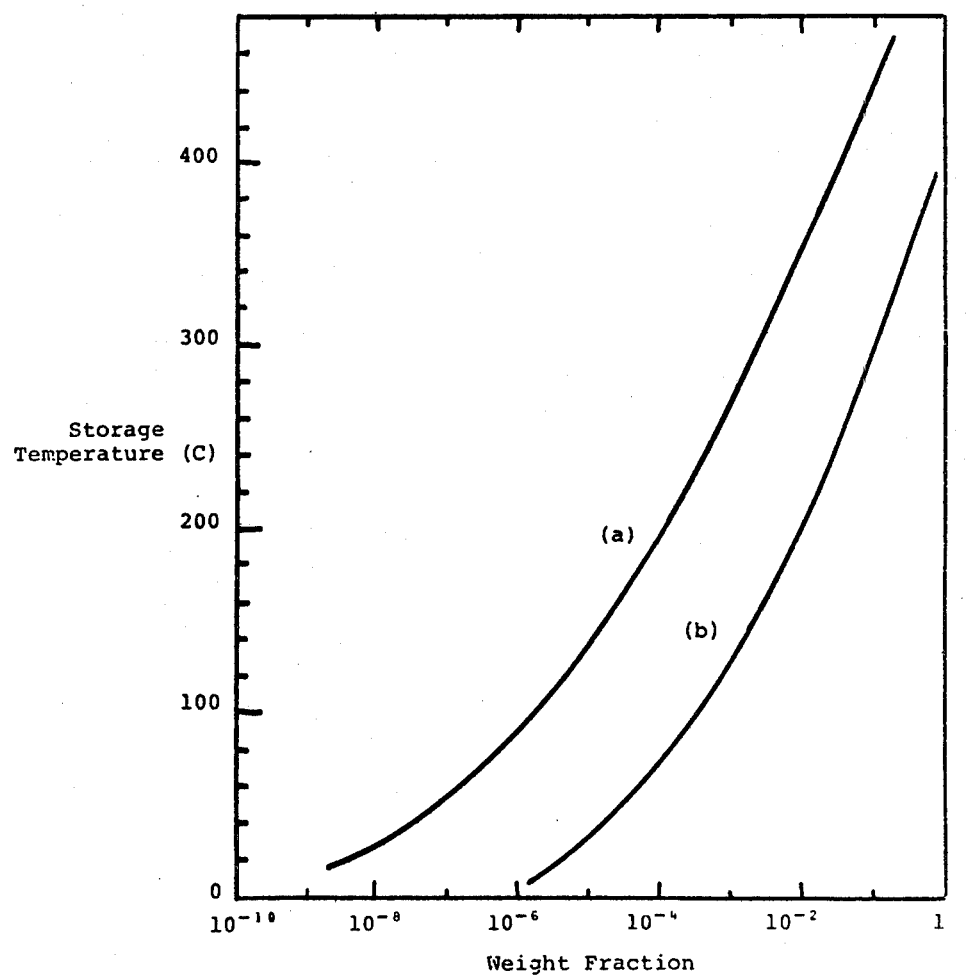
WASTE MATERIAL RELEASED
INTO ENVIRONMENT AFTER 20,000 YEARS
(a) Sample from Example 2.
(b) Sample obtained from Battelle Northwest.

FIXATION OF RADIOACTIVE MATERIALS IN A GLASS MATRIX

CROSS REFERENCE TO RELATED APPLICATION

This is a continuation of application Ser. No. 884,371, filed Mar. 9, 1978, now U.S. Pat. No. 4,224,177, and application is a continuation-in-part of our U.S. application Ser. No. 836,778, filed Sept. 24, 1977, now abandoned, which in turn is a continuation-in-part of U.S. application Ser. No. 784,437, filed Apr. 4, 1977, now abandoned.

BACKGROUND OF THE INVENTION

The disposal of large quantities of high level radioactive wastes generated in the reprocessing of spent power reactor fuel is a problem of considerable importance to the utilization of nuclear power. It is generally accepted that the most promising approach is to convert these radioactive wastes to a dry solid form which would render such wastes chemically, thermally and radiolytically stable. This problem of dry solid stability is closely related to the safety of human life on earth for a period of over 20,000 years. For example, radioactive waste contains the isotopes $Sr^{90}$, $Pu^{240}$, and $Cs^{137}$ whose half lives are 29 years, 66,000 years, and 30 years respectively. These isotopes alone pose a significant threat to life and must be put into a dry, solid form which are stable for thousands of years. The solid radioactive waste form must be able to keep the radioactive isotopes immobilized for this length of time, preferably even in the presence of a water environment.

A process for fixating radioactive materials in a dry solids form having high resistance to leaching and other forms of chemical attack would not only be suitable for the disposal of radioactive nuclear wastes, but also for the fabrication of radioactive sources useful in industry, medicine, and in the laboratory.

There does not presently exist any practical, foolproof means for the safe disposal, storage and immobilization of pernicious radioactive waste material. Present day storage containers do not provide sufficient isolation and immobilization of such radioactive material, sufficient long-term resistance to chemical attack by the surroundings, and sufficient stability at high temperature.

One present route is the so-called dry solids approach which involves the method of fixation of waste materials in glasses via melting glass procedures. This approach offers some improvement regarding isolation and decrease in the rate of release of radioactive elements when the outer envelopes or containers are destroyed. Further, glasses remain relatively more stable at high temperatures than plastics and are generally more chemically durable in saline solutions than are metals. Glasses with high chemical durability and low alkali ion conductivities are melted at very high temperatures, e.g., 1800° C. and higher. Such high melting processes are economically unsound and moreover, cause a dangerous problem due to the volatilization of pernicious radioactive materials. In view of the overall difficulty of handling radioactive material, and especially in view of the danger of volatilization of radioactive material into the atmosphere, attention was directed to using glasses having relatively low melting temperatures, that is to say, using glasses with $SiO_2$ content as low as 27 weight percent. While the problem of volatilization of radioactive materials was reduced, it was not completely controlled. Moreover, the resultant glass composition exhibited greatly reduced chemical durability and increased ion diffusion rates for the radioactive materials present therein. The greater this diffusion rate, the lower is the ability of the glass to keep the radioactive materials immobilized in its matrix. For long-term containment of radioactive waste, demanded under present day standards, these glass compositions were inadequate. Additionally, none or very small amounts of gaseous radioactive materials are trapped by the foregoing procedures.

As will be apparent hereinafter from the various aspects of applicants' contributions to the art, there are provided novel methods to obtain novel compositions and articles for the containment of pernicious and dangerous radioactive material over extraordinarily long periods of time. Unlike melting glass containment procedures, the methods of the invention need not involve any steps which would expose radioactive material to temperatures above about 900° C. thereby eliminating the environmental hazard due to volatilization of radioactive material into the atmosphere. In addition, there are provided novel methods for the fixation and immobilization of radioactive gas wastes such as Kr, I, Xe, Ra, etc., in a glass matrix.

SUMMARY OF THE INVENTION

The invention contemplates novel non-porous glass compositions or articles with high chemical durability to aqueous corrosion and with sufficiently low radioisotope diffusion coefficient values to provide protection of the environment from the release of radioactive material such as radioactive isotope, nuclear waste material, etc., encapsulated or entrapped therein. Such glass compositions are characterized by at least 75 mol percent of $SiO_2$ and by a radiation activity above one millicurie, preferably greater than one curie, per cubic centimenter of said glass compositions. In one aspect, the amount of radioactive material contained in the novel glass compositions is at least 0.1 mol percent, generally in the form of the oxide of at least five and preferably at least ten of the radioactive elements listed hereinafter. Preferably the novel glass compositions should contain at least 82 mol percent $SiO_2$, most preferably greater than 89 mol percent $SiO_2$.

From a practical standpoint, the upper limit of radioactive material contained in the novel non-porous glass composition will be governed, to a degree, by such factors as: the $SiO_2$ concentration in the glass, by the concentration and type of other ingredients which may be present in the glass such as $B_2O_3$, $Al_2O_3$, $TiO_2$, zirconia, alkali metal oxides, and $GO_2$, by the concentration and type of radioactive material encapsulated in the glass, by the volume fraction of the porous structure in the porous glass preform, by the various techniques employed to encapsulate the radioactive material in the glass, and other factors.

Radioactive material which can be encapsulated and immobilized in the glass matrix include radioactive elements (naturally occurring isotopes and man-made isotopes and existing as liquids, solids or gases), generally in the form of the oxide, such as carbon, rubidium, strontium, lanthanides cobalt, cadmium, silver, zirconium, molybdenum, technetium, niobium, ruthenium, rhodium, palladium, tellurium, cesium, barium, francium, yttrium, radium, actinides and the gases of krypton, iodine, bromine, xenon and radon. Especially suitable in the practice of the invention are radioactive wastes from nuclear reactors or other waste producing processes.

One embodiment of the invention is directed to novel glass articles with enhanced containment properties and characterized by an outer clad whose composition is at least 90 mol percent silica, preferably greater than 95 mol percent, and whose inner core contains the radioactive materials. The high silica content of the clad imparts to the articles a considerably greater chemical durability. The inner core has a lower silica concentration of the order set forth hereinbelow, i.e., at least 75 mol percent silica, preferably 82 mol percent, and most preferably 89 mol percent.

Various aspects of the invention are directed to novel methods for producing the aforesaid novel compositions or articles. The broad method is directed to encapsulating or entrapping radioactive material in a glass matrix which comprises impregnating the pores of a porous glass preform with radioactive material, drying when necessary, heating said porous glass preform until collapse of the porous structure occurs, thereby trapping said material in the resultant chemically inert, non-porous glass product.

The radioactive isotopes, as indicated previously, exist as gases, liquids or solids. The liquid isotopes are generally compounded into salts or other compounds, which, as with the solid isotopes, are dissolved into solution. Below, we treat such solutions separately from the gaseous isotopes. In the case of the solutions, two embodiments of the invention are described.

The literature adequately describes the preparation of porous glass preforms. Suitable preforms which may be utilized in the novel methods generally contain $SiO_2$ as a major component. In the practice of various embodiments of the invention the concentration of $SiO_2$ desirably is at least 75 mol percent $SiO_2$, preferably at least 82 mol percent $SiO_2$, and most preferably at least 89 mol percent $SiO_2$ (and preferably less than 1 mol percent alkali metal oxide). Such glasses are described in the literature, see U.S. Pat. No. 2,106,744, 2,272,342 and 2,326,059, for example. According to the first embodiment, the dopant consisting of the radioactive isotopes in the form of salts, oxides or other compounds are diffused into the pores of the preform; the preform is then removed from the dopant solution and is dried. Sintering of the "molecular stuffed" porous glasses allows for decomposition of the salts into oxides and incorporation into the glass matrix. Sintering is conducted at temperatures generally far lower than glass melting temperatures and thus minimizes the chances of radioactive material evaporation into the atmosphere. The resultant non-porous glass thus produced has a finite concentration of dopant throughout. According to the second embodiment, the dopant solution containing the radioactive compounds is diffused into the pores of the preform; the preform is removed from the dopant solution and immersed in one or several solutions of solvent such as water, methanol, ethanol, acetone and nitric acid; the preform is then removed from the solvent solution(s) after a sufficiently thick, substantially dopant-free region has been developed at the surface of the preform and is dried. Sintering as in the method of the first embodiment ensues to form a non-porous glass with an inner core region containing the radioactive dopant, and an outer cladding region with a silica content of at least 90 mol percent preferably greater than 95 mol percent, and essentially containing no radioactive material.

Two embodiments of the invention are likewise set forth hereinafter for entrapping radioactive gases into the glass matrix. According to the first embodiment the porous glass preform is dried and then exposed to the radioactive (waste) gas at a pressure determined by the desired trapped gas concentration in the glass, allowing the gas to dissolve into the glass matrix, and the pores are sintered at high temperatures in the presence of the radioactive gas. According to the second embodiment, the porous glass preform is first immersed in a solution containing one or more other dopant compounds desirably in the form of their salts, prior to drying. These dopant compounds may be chosen to increase the surface area which in turn increases the solubility of the radioactive gas in the glass or to lower the glass transition temperature. The concentration of dopant compounds in the glass may be varied if desired. After precipitating said dopant compounds, the preform is dried and, if necessary, further heated to decompose the dopant compounds generally to their oxide form. The preform is then exposed to the radioactive waste gas at a pressure determined by the desired trapped gas concentration in the glass, allowing the gas to dissolve into the glass matrix, and the pores are sintered at high temperatures in the presence of the radioactive waste gas.

The variation in dopant concentration in the glass preform prior to drying and incorporation of the radioactive waste gas may be desirable for several reasons. If the dopant is another radioactive waste product, it will be desirable to lower its concentration as low as possible near the surface of the glass preform to further reduce its chance of leaking to the environment. Secondly, if the dopant used increases the solubility of the gas in the porous structure of the preform, it will also be desirable to decrease its concentration as low as possible near the surface of the preform since this will result in a lowered dissolved radioactive gas concentration near the surface of the glass and thus decrease its chance of leakage into the environment. Thirdly, if the dopant lowers the glass transition temperature of the glass matrix, and its concentration is varied to have a maximum at the interior of the preform and a minimum in a layer adjacent to the surface, then corresponding differences in the concentration of the dissolved radioactive gases will be obtained.

In the earlier fiber optics patent, U.S. Pat. No. 3,938,974, we have limited the range of dopants used because high optical transmission was necessary and those dopants which caused the glass to attenuate light could not be used. However, in the radioactive fixation contemplated herein no such criteria need be applied.

A dopant is a compound which is deposited in the porous glass. Said compound, or in the case of gases, element or molecule, may be incorporated in the glass during collapsing as deposited, or after conversion to the appropriate oxide. In the case of metals it is often introduced as a nitrate in solution, or precipitated as a nitrate crystal. Upon heating, it decomposes to an oxide crystal, which upon collapsing of the structure, is incorporated in the silica structure.

Illustrative dopants include, of course, the radioactive material contemplated and described, the alkali metals, the alkaline earths, boron, germanium, aluminum, titanium, lead, bismuth, phosphorous and the rare earths, as nitrates, carbonates, acetates, phosphates, oxides, borates, arsenates and silicates in either hydrated or unhydrated form or mixtures thereof.

DETAILED DESCRIPTION OF THE INVENTION

Fabrication of the porous glass matrix may follow any of the available methods used by one practiced in the art to form porous glass in any desired shape, preferably cylindrical or rectangular, with a composition greater than 75% silica. We prefer to form our porous glass matrices in the shape of cylinders according to the methods disclosed in copending U.S. application Ser. No. 635,727, filed Nov. 26, 1975. Briefly, a glass is melted containing silica, boron trioxide and two alkali metal oxides (such as $Na_2O$ and $K_2O$) and drawn into long rods. By suitable heat-treatment, these rods are phase separated into two phases; one phase, a silica-rich phase containing also, $B_2O_3$ and alkali metal oxide and a silica-poor phase which contains greater amount of $B_2O_3$ and alkali metal oxide. The heat-treated rods are then immersed in a suitable leaching solution in order to dissolve and remove the phase containing the lower silica concentration. Removal of this phase and subsequent washing yields a porous glass preform characterized by a $SiO_2$ content greater than 90 mol percent which is ready for use as a matrix for the encapsulation of the radioactive material. Herein several procedures are followed depending upon whether the radioactive materials to be encapsulated are in the form of solids and liquids, or gases.

A. SOLIDS AND LIQUIDS

In the case of solid or liquid radioactive material including nuclear waste materials, the materials are generally available as an aqueous salt or other compound mixture of the various materials to be encapsulated. High level waste generally consists mainly of the aqueous raffinate from the first cycle of the well known Purex Solvent Extraction Process as well as other miscellaneous waste streams. Significant variation in the waste composition can occur. A typical composition is given in Table I below. Solvent is added to the waste material until all components have substantially gone into solution. Some processing plants also extract individual components from the waste mixtures such as Cs and Sr for specific use.

TABLE I

| Fission Products | Concentration (atomic %) | Replacements in stuffing solution |
|---|---|---|
| Rb | 1.0 | $Rb(NO_3)$ |
| Sr | 5.2 | $Sr(NO_3)_2$ |
| rare earths* | 17.8 | rare earth nitrate mixture |
| Zr | 20.3 | $Zr(NO_3)_4.5H_2O$ |
| Mo | 18.1 | |
| Tc | 2.1 | $Fe(NO_3)_2.6H_2O$ |
| Ru | 11.4 | |
| Rh | 1.0 | $Co(NO_3)_3.6H_2O$ |
| Pd | 6.2 | $Ni(NO_3)_2.6H_2O$ |
| Te | 2.3 | |
| Cs | 5.2 | $Cs(NO_3)$ |
| Ba | 5.2 | $Ba(NO_3)_2$ |
| actinides | 4.2 | rare earth nitrate mixture |

*We use rare earths and lanthanides indistinguishably to mean the series of elements consisting of lanthanum, cerium, prasdodymium, neodymium, promethium, samarium, europium, gadolinium, terbium, dysprosium, holmium, erbium, thulium, ytterbium and lutetium.

In the non-waste applications the radioactive elements may occur singly, or as groups or compounded into salts or other compounds. In any case, they must be dissolved into solution or melted.

Porous glass substrates (in convenient rod shape) are submerged in the dopant solutions containing the radioactive materials for a period long enough to allow diffusion of the dopant material solution (stuffing solution) into the pores. This time depends upon the temperature of the stuffing solution, the pore structure, and the size of the porous glass host.

Various methods may be followed once the stuffing solution has filled the pores with waste material or other dopant. According to one method, the porous glass preform is removed from the stuffing solution; then the dopant is caused to precipitate within the preform by any of several routes such as evaporating the solvent from the solution, decreasing the temperature of the solution, by chemical means, etc. If desired, the preform may be given a brief wash to clean its surface area. Optionally, the preform may then be immersed in washing solution such as a solvent with low solubility for the dopant for several hours of soaking. Thereafter, the preform is dried, e.g., in a desiccator, vacuum chamber, etc., preferably at relatively low temperatures. This method when completed by the drying and sintering procedure described hereinafter, yields non-porous glass compositions with an essentially homogeneous concentration of waste materials.

According to a second method, the porous glass preform is removed from the stuffing solution; the dopant is allowed to begin precipitation; and thereafter the preform is immersed in a solvent with intermediate solubility for the dopant materials for several hours. This latter soaking procedure allows the formation of a thick skin or clad at the outer surface of the preform by virtue of dopant being redissolved into the solvent. Soaking in several solvents with decreasing solubility for the dopants allows the removal of dopant from this skin region. Once accomplished, the preform is dried as illustrated above. This method, when completed by the drying and sintering procedures described hereinafter, yields non-porous glass compositions with a skin of substantially lower concentration of dopant at the outside surface of the preform. Since it contains a lower dopant concentration, this skin acts to protect the interior of the glass from chemical attack and acts to further delay diffusion of radioactive materials from the glass interior to the surface where they may react with the environment.

Illustrative drying and sintering procedures including keeping the preform prepared by either of the aforesaid illustrated two methods under vacuum at low temperatures for approximately a day and then heating them, essentially at a rate of 15° C./hr. still under vacuum, to a temperature above the decomposition temperature of the dopant and approximately 100° C. below the glass transition temperature of the dopant-free porous glass matrix. At this point, any desired redox conditions for the dopant may be accomplished by various routes such as by further heating to the sintering temperature of the preform under vacuum for a reduced valence state of the dopant, or heating to the sintering temperature of the preform under a hydrogen-containing atmosphere for a highly reduced valence state of the dopant, or by heating to the sintering temperature of the preform under an oxygen-containing atmosphere of suitable pressure for a partially or totally oxidized dopant.

This ability to alter oxidation-reduction states of the radioactive materials allows a fine control of the resistance of the glass to chemical attack since many of the radioactive materials, especially the actinides, are less soluble in water when in a reduced state. The ability to alter the oxidation-reduction state of such dangerous materials provides an additional safeguard against premature dispersion of such materials into the environment.

After sintering at high temperatures the products are cooled to ambient temperature whereby they form a non-porous glass completely encapsulating and immobilizing the radioactive material in its glass structure.

In a further embodiment, the invention provides for the storage and immobilization of radioactive contaminated boric acid aqueous solutions resulting during its use as a heat transfer media for pressured water nuclear reactors. Such contaminated solutions contain various radioactive impurities including Co, Cs, Mn, Cr, Sr, and Zn as well as inert impurities such as Fe. Presently such contaminated solutions are disposed by fixation in cement forms and then buried a few feet beneath the ground. This disposal technique is very unsatisfactory since the cement has a low loading factor because the boric acid at room temperature has about a 5% solubility. Furthermore, cement is not especially insoluble and leaches into the water table. Thus, even though one is dealing with the disposal of low level nuclear fuel cycle wastes, the detrimental impact on the environment and the population is obvious.

The novel methods disclosed herein provide for the stuffing of such low level radioactive contaminated boric acid solutions into the porous glass preform. Such stuffing procedures can be effected at temperatures which will afford loadings several times greater than that achieved in the cement fixation technique. For example, the solubility of boric acid in water at 100° C. is approximately 30 weight percent which permits about six fold greater loadings than are achieved at room temperature using the cement fixation technique.

The novel non-porous glass compositions of this latter embodiment are characterized by the encapsulation and immobilization of low level radioactive contaminated boric acid wastes (from pressurized water nuclear reactors), such waste being fixed in the glass matrix in the form of oxides of boron and the radioactive contaminants including cobalt and chromium. Other contaminants such as strontium, cesium, manganese and/or zinc may also be present in oxide form. Such compositions generally contain less than one weight percent of radioactive contaminants (in the form of their oxide). However, in serious leakage problems in the pressurized water nuclear reactor, the boric acid wastes can contain much higher levels of contaminants.

In Examples I and II, the dopant solution contains only cesium nitrate in order to demonstrate simply the behavior of dopant and porous glass system. Cesium is chosen because of its high concentration in the waste material and because by virtue of being an alkali metal its diffusion coefficient through glass is higher than other constituents except for rubidium (another alkali metal) which, however, is present at low concentrations. All compositions are on a mole basis. Cesium poses a further problem because of its high vapor pressure at high temperatures normally required to melt glasses, which we circumvent by the practice of the novel methods contemplated herein. Thus, of all the radioactive isotopes in reactor waste, Cs probably poses the most problems in containment in glass and the greatest dangers in the near term. Accordingly, a procedure which will immobilize cesium in a glass matrix will also solve the containment problems associated with other radioactive isotopes. Accordingly, a method which will result in the immobilization of Cesium will also immobilize other radioactive isotopes.

In Examples III to VI below, the molecular "stuffing" process of Example I is followed. In Example III, the stuffing solution contains $SrNO_3$ which like $CsNO_3$ is present in pernicious waste streams. The solution in Example IV stimulates possible low level waste products in boric acid. The solutions in Examples V and VI resemble the actual unseparated waste material with Example VI simulating the major components of typical radioactive wastes generated in reprocessing fuel elements from utility-company reactors.

EXAMPLES I and II

The porous glass preform is obtained by melting a glass having the composition: 60.2 mol percent $SiO_2$, 32.8 mol percent $B_2O_3$, 3.6 mol percent $Na_2O$ and 3.4 mol percent $K_2O$, in a platinum crucible near 1400° C., homogenizing the melt with a platinum stirrer, thereafter pulling the melt into rods using a glass bait, cutting into cylinders or rods 7 mm. diameter $\times 30.5$ cm. long, heat-treating these rods at 550° C. for 1.5 to 2 hours, annealing the glass, washing in 2.5% aqueous solution of HF for 60 seconds, leaching in 3N HCl and 15 to 20% aqueous $NH_4Cl$ solution, and then washing in water. The resulting porous glass preform is characterized by an interconnective porous structure and has the following composition: 95 mol percent $SiO_2$, 5 mol percent $B_2O_3$, and less than 0.1 mol percent alkali metal oxide.

A porous glass preform rod so prepared is then placed into a so-called "stuffing" solution containing the waste material which in this case is an aqueous solution of $CsNO_3$ (concentration is 65 weight percent $CsNO_3$) for at least three hours while maintaining the solution at 105° C. In Example I, the stuffing solution of $CsNO_3$ is then replaced by a mixture of cold water and methanol for a few minutes until precipitation of $CsNO_3$ occurs in the porous structure, then the rod is soaked in methanol for three hours. In Example II, the stuffing solution is replaced by cold water and methanol for less than 2 minutes whereupon precipitation of $CsNO_3$ occurs. Then the glass rod is soaked in water for 3 hours at 2° C., followed by soaking in methanol for at least another 3 hours at 0° C. These two soakings produce a thin skin or clad of the order of 1 mm. around the cylindrical surface of the rod. The skin was devoid of $CsNO_3$.

In both Examples I and II, after maintaining the glass rods for 24 hours at 0° C. under vacuum (of the order of 0.1 mm. of Hg), the rods are dried under vacuum at increasing temperatures ranging from 0° C. to 625° C. to remove solvent, water and methanol, and to decompose the cesium nitrate dopant to its oxide. A heating rate of 15° C./hour is used. Further heating to 840° C., which is the sintering temperature of the porous glass rod, is conducted under an oxygen atmosphere. Once the porous glass structure collapses, consolidation is considered to be complete and the sintered non-porous rod is removed from the furnace and brought to ambient temperature.

Thereafter, both non-porous rods obtained from Examples I and II were tested for cesium concentration and associated refractive index profile. The composition of the center of the rods from both Examples I and II was 92.1 mol percent $SiO_2$, 4.9 mol percent $B_2O_3$ and approximately 3 mol percent $Cs_2O$ (which corresponds to an index of refraction of 1.487) with trace amount of alkali metal oxide. In Example I, this concentration remained essentially the same up to a very thin layer (or skin) appreciably less than 1 mm. at the surface. Analysis of the non-porous rod from Example II gave a refractive index value of 1.458 in a 1 mm. thick surface layer about the rod. This value index indicates no measurable $Cs_2O$ dopant content in this layer.

The sole Figure is a plot of the fraction of waste material released into the environment after 20,000 years of storage for a sintered glass product from Example II compared with a waste product obtained by the melting glass technique from Battelle Pacific Northwest Laboratory, Richland, WA, U.S.A.

In order to obtain estimates of the diffusivity of cesium ions to allow estimates of the loss of radioactive waste as a function of time, electrical conductivity measurements were made on the two non-porous glass products obtained via the teachings of Examples I and II above and on a glass product (melting process) obtained from Battelle Pacific Northwest Laboratory. The values obtained are listed in Table II below.

TABLE II

| CONDUCTIVITY AT TWO TEMPERATURES | | | |
| --- | --- | --- | --- |
| Glass Product | Temp. °C. | Conductivity $(ohm-m)^{-1}$ | Diffusivity[1] $(cm^2/sec)$ |
| Example I | 100 | $8 \times 10^{-18}$ | $1 \times 10^{-24}$ |
| Example II[2] | 100 | $9 \times 10^{-16}$ | $1.4 \times 10^{-22}$ |
| Battelle[3] | 100 | $3.5 \times 10^{-13}$ | $5.3 \times 10^{-20}$ |
| Example I | 400 | $1 \times 10^{-9}$ | $3 \times 10^{-16}$ |
| Example II[2] | 400 | $3 \times 10^{-8}$ | $1 \times 10^{-14}$ |
| Battelle[3] | 400 | $7 \times 10^{-7}$ | $2 \times 10^{-13}$ |

[1]These are calculated using the Stokes-Einstein relationship and are therefore only estimated values.
[2]The data reported for Example II are for the surface layer only. The central region has the same values as reported for Example I.
[3]Battelle Pacific Northwest Laboratory, Richland, Washington. This glass product contained less than one-half the cesium concentration of dopant encapsulated in glass products from Example I and II.

In Table II above, diffusivity is estimated from conductivity values using the Stokes Einstein relationship. These data establish that the non-porous glass product of Examples I and II when compared with the glass product (a melting procedure product from Battelle Pacific Northwest Laboratory) at room temperature, exhibit diffusivity values which are lower by several orders of magnitude notwithstanding the fact that the former products contained more than twice as much dopant as the latter product. From the data, the theoretical weight loss after 20,000 years of exposure to a perfect sink (material which does not allow buildup of diffused molecules or atoms at the boundary—which is the most pessimistic estimate) is shown in the sole Figure plotted as a function of storage temperature for a non-porous rod product made according to the method outlined in Example II.

EXAMPLE III

A porous glass preform (in the shape of a rod) prepared as described in Example I was immersed in a solution containing 95 grams of $Sr(NO_3)_2$ per 100 ml. of water at 60° C. The rod was allowed to soak in this solution for 4 hours, then the rod was removed from this solution and placed in cold isopropyl alcohol. Precipitation of $SrNO_3$ occurred slowly within the porous structures, taking 2 to 3 hours to reach completion. The rod was then soaked in a solution consisting of 66% ethanol and 34% water at 0° C. for 5 hours to remove the $SrNO_3$ dopant from a cladding region at the surface of the rod. Finally, the rod was soaked in a cold 90% ethanol-10% water mixture and then in a cold isopropanol bath. Thereafter, the rod was dried and collapsed (sintered) as in Examples I and II, beginning with a stage in vacuum for 24 hours at 0° C. The rod when withdrawn from the furnace after sintering contained strontium incorporated into the glass structure in a core region of the rod; the cladding region was essentially free of strontium.

EXAMPLE IV

A porous glass preform rod prepared in Example I is soaked in a solution at 100° C. containing 25 grams $H_3BO_3$, 0.27 gram $Fe(NO_3)_3 \cdot 9 H_2O$, 0.27 gram $Cs(NO_3)$, 0.27 gram $Sr(NO_3)_2$, 0.27 gram $Co(NO_3)_2 \cdot 6 H_2O$, 0.27 gram $Cr(NO_3)_3 \cdot 9 H_2O$, 80 ml of water, and 1 ml of $HNO_3$ (13.4 molar concentration) for 3 hours. The rod is removed from the solution and it is then immersed in 0° C. water for 30 minutes, and dried in vacuum at 0° C. for 24 hours. The rod is subsequently heated at a rate of 15° C./hr. to 625° C. under vacuum to remove remaining solvent and to decompose the metal nitrate dopants, and then heated at a rate of 50° C./hr. to 850° C. under vacuum to collapse the pores and consolidate the glass. The final product is non-porous glass solid containing $SiO_2$, $B_2O_3$, and the oxides of Cs, Sr, Fe, Co, and Cr as an integral part of the matrix. The water immersion step after the soaking (stuffing) step decreases the dopant concentration near the surface of the rod. The rod may also be soaked in methyl acetate or acetone after removal of same from the stuffing solution in order to form a cladding region at the surface of the rod with lower dopant concentrations. However, rods prepared in this latter manner exhibit a tendency to split along its length during the drying and collapsing steps. However, such splitting of the rods is not detrimental to the fixation and immobilization of the radioactive material therein.

EXAMPLE V

A solution is prepared comprising:
12.9 grs $Sr(NO_3)_2$
18 grs $Rb(NO_3)$
15.9 grs $Ba(NO_3)_2$
104.1 grs $Zr(NO_3)_4 \cdot 5H_2O$
153.6 grs $Fe(NO_3)_3 \cdot 9H_2O$
4.2 grs $Co(NO_3)_2 \cdot 6H_2O$
21.3 grs $Ni(NO_3)_2 \cdot 6H_2O$
12.3 grs $Cs(NO_3)$
89.4 grs rare earth nitrate mixture
and sufficient water to cause the above metal dopants to dissolve therein at approximately 100° C. A porous glass preform (in the shape of a rod) made as described in Example I was soaked in the above (stuffing) solution for 3 hours. The rod was then removed from the solution and inserted into a solution of 3N $HNO_3$ at 0° C. for 10 minutes. The rod was then soaked in acetone for 2 hours at 0° C. and was then placed in a drying chamber maintained at 0° C. with suction pumping means operating a period of 24 hours (for withdrawing solvent from the rod). Thereafter, the rod was heated under vacuum up to 625° C. at a rate of 15° C./hour. The rod was held at 625° C. for 24 hours under vacuum, then heated slowly to 840° C., also under vacuum to obtain a highly reduced state for the waste material dopants contained in the porous structure of the preform. The rod was sintered near 840° C. and formed a solid non-porous glass product with the waste material as an integral part of its structure.

EXAMPLE VI

A solution containing 10 major components from a typical radwaste composition often denoted as PW8a is used in this Example. The relative concentration of these components is representative of the waste stream composition with a reconcentration factor of three times. The solution contains the following:

- 148.8 grs $Fe(NO_3)_3 \cdot 9H_2O$
- 21.3 grs $UO_2(NO_3)_2 \cdot 6 H_2O$
- 33.6 grs $NaNO_3$
- 18.6 grs $Zr(NO_3)_4 \cdot 5H_2O$
- 19.8 grs $Nd(NO_3)_3 \cdot 5H_2O$
- 9.0 grs $Ce(NO_3)_3 \cdot 6H_2O$
- 4.2 grs $La(NO_3)_3 \cdot 6H_2O$
- 4.2 grs $CsNO_3$
- 2.4 grs $Sr(NO_3)_2$
- 3.0 grs $Ba(NO_3)_2$
- 264.9 grs $HNO_3$
- 150 ml $H_2O$ Sufficient water and nitric acid in amounts indicated above were added to maintain the above metal nitrates in solution. The preparation of the solution was accomplished stage-wise at varying temperature levels; the final temperature being 99° C.

Six porous rods prepared as in Examples I and II were immersed in the above solution maintained at 99° C. for 3 hours, rinsed in 20° C. water for 5 seconds, and then placed in a desiccator maintained at 20° C. for 16 hours (hereinafter "non-clad" rods). Three non-clad rods were removed from the desiccator and were subjected to the following immersion treatments to produce a cladding region at the surface of the rod having a lower concentration of dopants (waste materials) than the inner core of the rod (hereinafter "clad" rods): 30 minutes in isopropanol containing 8 weight percent $UO_2(NO_3)_2 \cdot 6H_2O$, 4 weight percent $Ce(NO_3)_2 \cdot 6H_2O$ and 2 weight percent $La(NO_3)_3 \cdot 5H_2O$, and an additional 30 minutes in another solution of 80% chloroform and 20% isopropanol. These three clad rods were then dried for 24 hours at 0° C., at <1 mm. of Hg; thereafter, they were put into a furnace with the remaining 3 non-clad rod rods at room temperature and heated at 15° C./hr to 625° C. under vacuum to remove solvents and to decompose the metal nitrate dopants to metal oxides. The rods were grouped into three pairs, one clad and one non-clad. Each pair was then heated at 50° C./hr under different environments, namely (a), (b), or (c) below:

(a) 95% $N_2$ and 5% $H_2$ at one atm. (high reducing condition);
(b) Under vacuum, i.e.,<1 mm. of Hg (a moderate reducing condition); and
(c) One atm. of air (an oxidizing condition).

At about 860° C. sintering and collapse of the porous structure of the rods occurred.

Analysis of the resulting 3 pairs of non-porous glass rod products showed the metal oxide dopants to be in appropriately varying oxidation states. It is quite apparent that by the practice of this invention there can be obtained novel non-porous, chemically inert, glass products containing radioactive materials (in their lower state of oxidation), e.g., the actinides, encapsulated and immobilized therein for extraordinary long periods of time, e.g., centuries.

B. CASES

Various embodiments of the invention, as noted hereinabove, are directed to novel methods for the encapsulation and immobilization of radioactive gases in glass.

One such novel method is illustrated by Examples VII and VIII wherein the porous glass rod, as the host, is partially dried at 0° C. under vacuum for about 24 hours, then further dried under vacuum by heating progressively to an upper drying temperature which is 50° C. to 150° C. below the glass transition temperature of the undoped consolidated glass used as the host. This drying temperature is about 625° C. for the porous glass rod employed. At 625° C., one or several radioactive gases are introduced into the enclosed chamber containing the rod. The temperature is held at 625° C. for approximately 24 hours, then the rod is heated at approximately 50° C./hour up to 835°–900° C. where sintering occurs under an atmosphere of the radioactive gases, thereby trapping the dissolved gases within the glass matrix. The heating rates and holding temperatures may be readily altered, if desired. Rapid heating may in some cases break the rod. This breakage, however, has no effect on the fixation and immobilization of the radioactive gas within the glass host.

In a second novel method, the porous glass rod is immersed in a solution containing one or several dopants. If desired, these dopants may be chosen to increase the radioactive waste gas solubility in the rod. After the dopants have diffused into the pores of the glass rod, the rod is removed from the dopant solution and immersed in a dopant-free solvent. If desired, the concentration of dopant within the pore structure may be varied by various routes. First, for no dopant concentration variation in the glass rod, the solvent bath will be chosen to cause precipitation of the dopants evenly within the pores of the rod. Then the solvent is removed and the rod dried. Secondly, (see Example IX) if a dopant-free layer forming the surface of the rod is desired, the dopant is precipitated as in the first case, but then the rod is transferred to another solvent or solvents whereby the dopant in the surface layer is redissolved and allowed to diffuse out of the rod, before drying. Thirdly, if a graded variation of dopant is desired with the structure of the rod, the rod is first soaked in a solvent which does not precipitate the dopant and allows its diffusion out of the pore structure. Then it is transferred to another solvent or solvents which induce precipitation and thereafter the rod is dried.

If desired, the drying step can begin at 0° C. in vacuum. The rods are then slowly heated, i.e., rate of 15° C./hr, to 625° C. under vacuum to remove remaining solvent and allow for dopant decomposition. At 625° C., one or several radioactive gases are introduced into the heating chamber containing the porous rods, and the temperature is held at 625° C. for about 24 hours. Then the rods are heated at a rate of 50° C./hr up to 835°–900° C. where sintering occurs thereby incorporating the dissolved gas into the glass matrix.

In a third novel method, one can develop a radial variation in the concentration of the radioactive gases dissolved within the glass structure. Here the porous glass rod is doped with a material which will reduce its glass transition temperature such as potassium in the form of potassium nitrate. After the dopant has completely diffused into the pores of the rod, the dopant is precipitated within the pores either thermally by cooling the rod or by introducing a solvent with very low solubility for the dopant. The rod is then immersed into a solvent with from 5 to 10% solubility for the dopants in order to remove dopant from a layer adjacent to the surface of the rod. After drying of the solvent, the rod will have a high concentration of dopant in the interior and a low concentration in the surface layer thereof. As a result, the rod will have a higher sintering temperature for its surface layer and a lower sintering temperature for its interior. The sample is dried under vacuum at 0° C. for about 24 hours. It is then heated to 600° C. under vacuum at 15° C./hr. At 600° C. one or several radioactive gases are introduced into the chamber containing the rod. The temperature is then slowly raised until the inner region of the porous glass rod is sintered, while remaining below the temperature at which the outer region of the rod sinters. Now the radioactive gases are removed from the environment of the rod and the temperature raised to sinter the surface layer. By this method the inner region of the rod will contain dissolved radioactive gases while the surface layer will be essentially free of dissolved radioactive gas content.

EXAMPLE VII

A porous glass preform prepared as described in Example I was immersed in methanol for 3 hours at ambient temperature. It was then transferred to a drying chamber maintained at 0° C. for 24 hours with suction pumping means operating to dry the rod. The rod was heated to 650° C. at a rate of 50° C./hr to complete drying. At 650° C. Kr gas was introduced into the chamber containing the rod at 1 atmosphere. The rod was then kept at 650° C. for 18 hours in a Kr environment and heated to 880° C. to achieve sintering in the Kr environment, thus trapping the dissolved Kr gas in the glass matrix.

EXAMPLE VIII

The procedure of Example VII is repeated except that instead of krypton, iodine gas was introduced into the chamber at 650° C. by boiling iodine pellets to achieve an atmosphere of iodine at 1/10 bar of pressure. The rod was kept for 18 hours at 650° C. in this iodine environment and was heated to 880° C. to achieve sintering of the pores of the rod thus trapping the dissolved iodine gas into the glass matrix as evidenced by a pink color of the resulting non-porous glass rod product.

EXAMPLE IX

This example illustrates incorporating both a dissolved solid and a gaseous dopant into the glass matrix.

A porous glass preform prepared as described in Example I was immersed in a 67 weight percent $CsNO_3$ solution at 105° C. for 4 hours. The rod was then transferred to, and immersed into, pure water at 0° C. to induce precipitation of the cesium nitrate within the pores of the rod. Total precipitation took 30 seconds. The rod was left in water at 0° C. for 3 hours to induce a variation in cesium nitrate concentration within the pores, resulting in a cylindrical layer free of cesium nitrate adjacent to the surface. The rod was then transferred to and immersed in methanol at 0° C. where it was kept for 3 hours to further reduce the cesium nitrate concentration at the surface. Drying began immediately thereafter by inserting the rod into a vacuum chamber at 0° C. for 24 hours. Thereafter, the rod was heated to 625° C. at a rate of 15° C./hr to complete drying and to induce decomposition of the cesium nitrate to cesium oxide. The rod was maintained under vacuum at 625° C. for 24 hours. Krypton gas was then introduced into the chamber until a pressure of one atmosphere was reached. The rod was maintained at 625° C. for an additional 24 hours in this Kr environment, followed at heating at 50° C./hr to the sintering temperature of the rod to thus encapsulate and immobilize dissolved Kr as well as Cs in the glass matrix.

As a result of the improved encapsulation of radioactive material especially radioactive nuclear waste by this invention, these radioactive materials can be put to beneficial use for mankind instead of posing an irrepressible threat to life on earth. Some examples of useful applications are discussed below.

After sintering the porous glass, the radioactive elements are completely encapsulated within the glass matrix. These radioactive elements are chemically bonded and immobilized within the novel glass article and in such form represent a safe, extraordinarily long-term containment of pernicious and hazardous radioactive nuclear waste streams. The novel glass articles may be transported with little risk of leakage of the radioactive isotopes into the environment. They can be deposited into subterranean vaults for long-term storage. These vaults would be preferably more than 1,000 feet below the surface of the ground.

Some radioactive isotopes, including some which do not come from radioactive wastes can be used for beneficial applications rather than storage. Such applications include sterilization of foodstuffs and drugs by destroying bacteria, viruses and other microorganisms, uses in medical and industrial instrumentation, in educational devices, and in research. For sterilization, glass articles containing selected isotopes including radioactive cesium, strontium and cobalt can be used to preserve foods and to recover the nutrients in sewage sludge for inclusion into the food cycle. These applications are not widely used commercially today because suitable containers must be developed to prevent contamination of the foodstuffs by radioactive isotopes and to prevent the associated high probability of radiation poisoning which would occur from their ingestion. Our invention will allow the use of radioactive materials which are produced in large quantities in nuclear reactors by safely encapsulating them as described herein to sterilize food products.

The safe encapsulation of radioactive waste materials in glass articles by our invention also allows their use in medical, industrial, educational and research instrumentation where radiation sources are required for ionization, sterilization, irradiation of patients, quality control and miscellaneous equipment for the detection of flaws in materials by gamma ray irradiation.

We claim:
1. A glass composition containing radioactive gas dissolved, encapsulated and immobilized in the glass matrix, said composition being characterized by: (a) containing at least 75 mol percent $SiO_2$, (b) having high chemical durability to aqueous solution, and (c) containing radioactive gas selected from the group consisting of krypton, iodine, bromine, xenon, radon, and mixtures thereof dissolved and fixed in the silica structure of said glass composition whereby leakage of said radioactive gas to the environment at environmental temperature is prevented for extremely long periods of time.

2. A glass composition as claimed in claim 1 wherein said radioactive gas is selected from the group consisting of krypton, iodine, bromine, xenon and radon.

3. A glass composition as claimed in claim 1 wherein said composition contains at least 82% $SiO_2$.

4. A glass composition as claimed in claim 1 wherein said composition contains at least 89% $SiO_2$.

5. A glass composition as claimed in claim 1, 2, 3, or 4 wherein said dissolved radioactive gas is present in an amount sufficient to provide a radiation activity above 1 millicurie per cubic centimeter of said glass composition.

6. A glass composition as claimed in claim 1, 2, 3, or 4 having a radiation activity of at least one curie per cubic centimeter of said glass composition.

7. A glass article characterized by: (a) an outer glass clad or skin composition of at least 90 mol % $SiO_2$ and substantially free of radioactive material, (b) an inner core composition of at least 75 mol % $SiO_2$ and containing a radioactive gas selected from the group consisting of krypton, iodine, bromine, xenon, radon, and mixtures thereof dissolved and immobilized in said core composition, and (c) high chemical durability to aqueous solution.

8. A glass article as claimed in claim 7 wherein said radioactive gas is selected from the group consisting of krypton, iodine, bromine, xenon and radon.

9. A glass article as claimed in claim 7 or 8 wherein said dissolved radioactive gas is present in an amount sufficient to provide a radiation activity of at least one millicurie per cubic centimeter of said glass article.

10. A method of preventing the dissemination of radioactive material into the environment which comprises:

(a) impregnating the pores of a porous glass preform with a radioactive gas selected from the group consisting of krypton, iodine, bromine, xenon, radon and mixtures thereof, said preform being characterized by an interconnected porous structure and containing at least 75 mol % $SiO_2$, (b) heating said preform to sintering temperature and causing the dissolution of the radioactive gas therein, and (c) cooling the resulting sintered glass product which contains the radioactive gas dissolved, encapsulated and immobilized in said glass product.

11. Method as claimed in claim 10 wherein said gas is selected from the group consisting of krypton, iodine, bromine, xenon and radon.

12. Method as claimed in claim 10 or 11 wherein said dissolved radioactive gas is present in an amount sufficient to provide a radiation activity of at least one millicurie per cubic centimeter of glass product.

* * * * *